April 25, 1933.  F. J. GOUGH  1,905,089
APPARATUS FOR THE CONTINUOUS CALCINATION OF GYPSUM
Filed Nov. 18, 1929  2 Sheets-Sheet 2
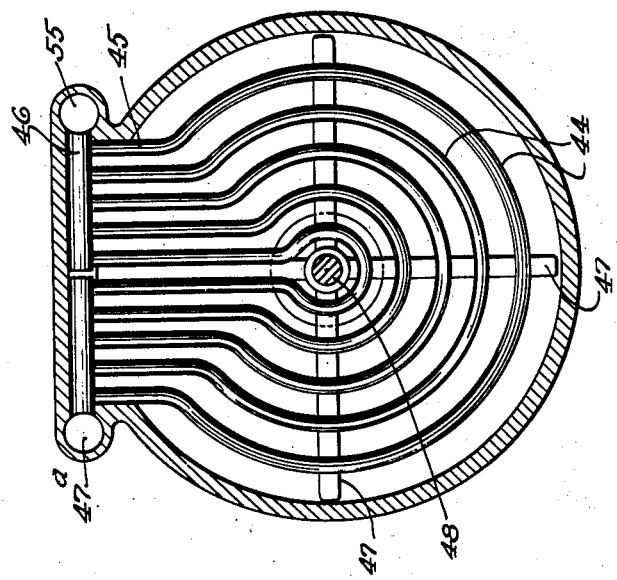
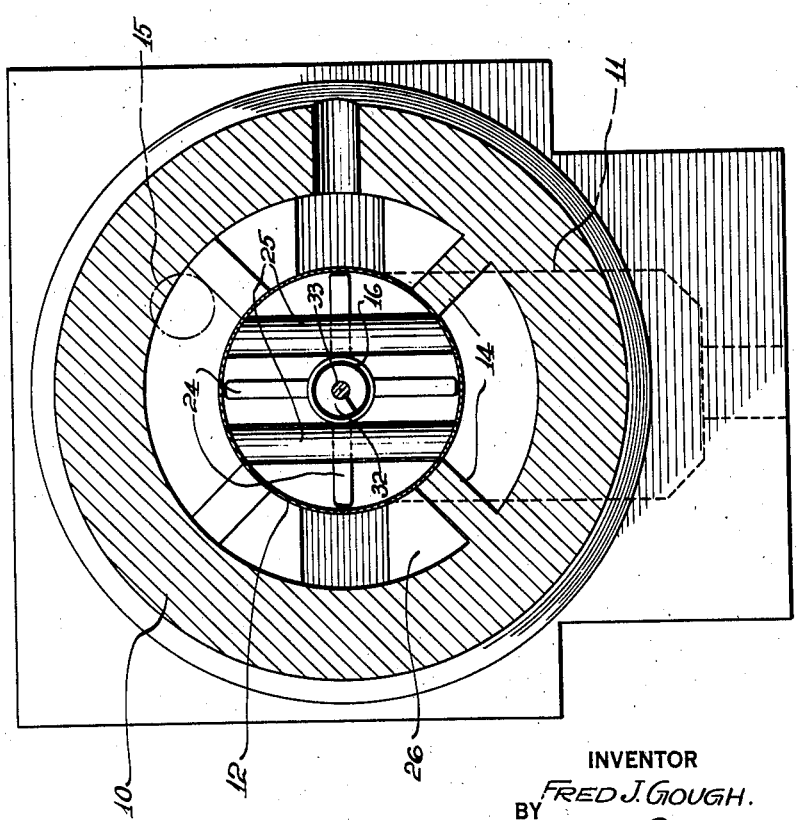
INVENTOR
FRED J. GOUGH.
BY
ATTORNEY Patented Apr. 25, 1933

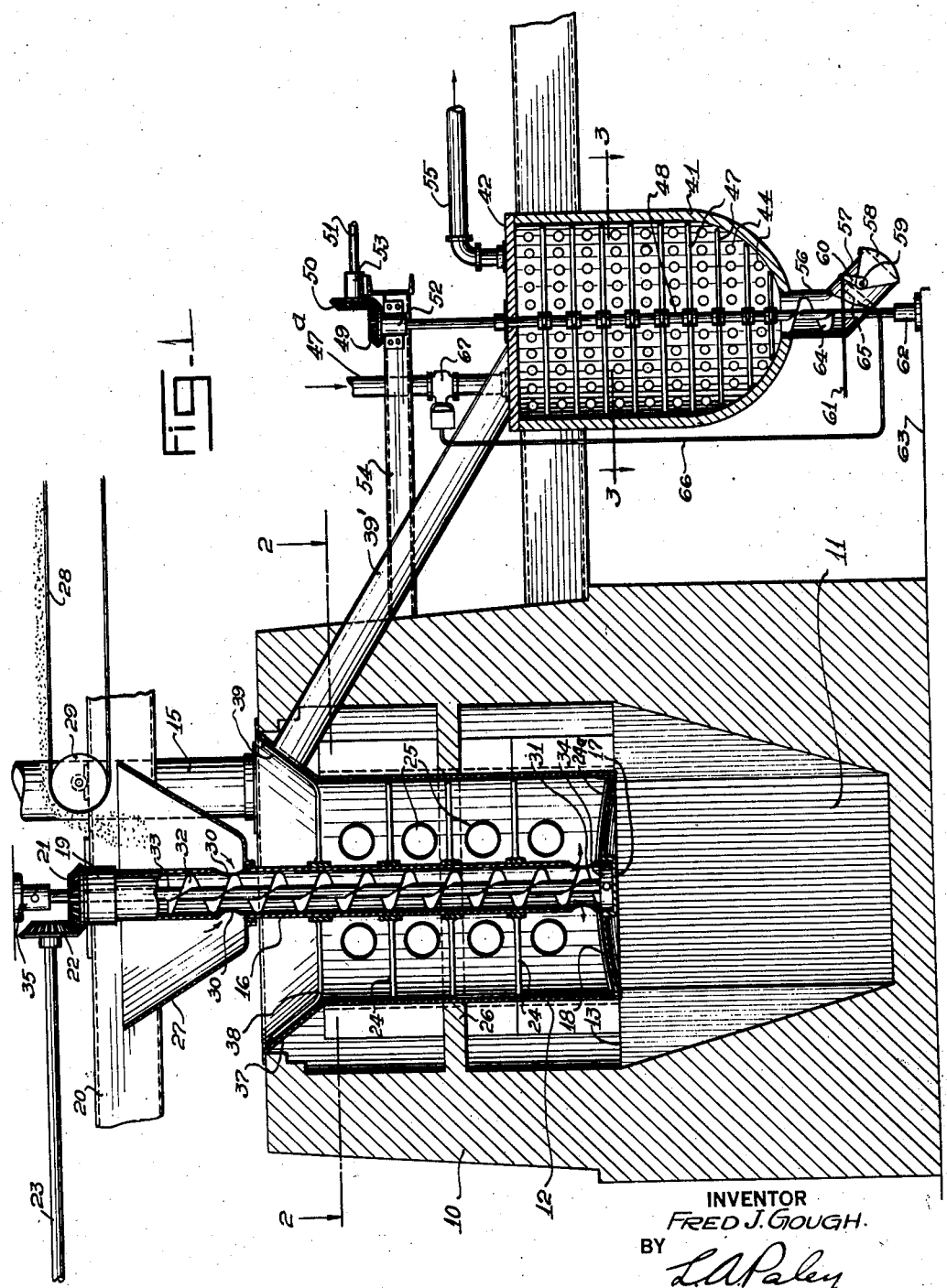

1,905,089

UNITED STATES PATENT OFFICE

FRED J. GOUGH, OF FORT DODGE, IOWA, ASSIGNOR TO UNITED STATES GYPSUM COMPANY, OF CHICAGO, ILLINOIS, A CORPORATION OF ILLINOIS

APPARATUS FOR THE CONTINUOUS CALCINATION OF GYPSUM

Application filed November 18, 1929. Serial No. 407,812.

This invention relates to an apparatus for continuously heating materials and has reference more particularly to an apparatus of the class described in which gypsum is calcined continuously.

In the standard method of calcining gypsum by the batch method, considerable time is lost due to filling and dumping of the kettles. Considerable heat losses occur during the filling and dumping operation. Large size and expensive conveying and handling equipment is necessary to handle the gypsum only at certain intervals. The kettle bottoms are frequently burned out due to the high temperature obtained. The raw gypsum rock must be ground very fine at a considerable cost in order to obtain the desired characteristics of the finished product.

An object in this invention therefore, is to provide a continuous method of calcining gypsum in order to reduce fuel and equipment costs over the batch method of calcination.

Another object of the invention is to provide a continuous calcination method which may be automatically controlled by a thermostatic regulator so as to produce a uniform product.

A further object of the invention is to design a method of calcination which will produce a calcined gypsum having a high consistency.

A still further object of the invention is to provide a method of and apparatus for the continuous calcination of gypsum in which the kettle bottoms are not quickly burned out; also to improve methods of and apparatus for the calcination of gypsum in other respects hereinafter specified and claimed.

Reference is to be had in the accompanying drawings, forming a part of this specification, in which Fig. 1 is a sectional elevation of my improved calcining apparatus.

Fig. 2 is a sectional plan view through the apparatus taken on the line 2—2 of Fig. 1, and Fig. 3 is a sectional plan view through the apparatus on the line 3—3 of Fig. 1.

In the manufacture of calcined gypsum by the standard batch method, the raw gypsum is usually fed into the kettle at a temperature of 100° F. and the first stage of calcination consists of heating this rock from 100° F. to the boiling point, which is approximately 250° F. Very little water is expelled during this period of heating up to 250° F., the temperature "drags" and remains the same for about thirty minutes, during which time the largest percentage of the moisture is expelled, accompanied by a boiling of the powdered mass of gypsum. The temperature then rises rapidly to 320° F. at which temperature the calcination is finished and the material is dumped out of the kettle, after which a new batch of raw gypsum is loaded into the kettle. The resulting calcined gypsum or stucco will have a consistency of 72 cc., a compressive strength of 1200 pounds per square inch and a setting time of thirty minutes.

With my improved method and apparatus, the present kettle equipment is used as much as possible and the proper alterations are made to permit of continuous operation. My improved method contemplates the feeding of the raw gypsum continuously into the bottom of a kettle full of calcining gypsum, the temperature of the kettle being maintained at about 275° F. The raw material reaches a temperature of 250° F. almost immediately and turns into a wet, logy mass which remains at the bottom of the kettle until nearly all the moisture is expelled. When it gradually reaches a temperature of 275° F., it breaks up into light, free-flowing particles and ascends toward the upper surface of the body of material in the kettle. It is evident in feeding the raw gypsum into the boiling mass of gypsum maintained at a temperature of 275° F., it will attain the boiling temperature very rapidly and as it is added in a continuous manner in small quantities compared to the bulk in the kettle, it gives up its moisture rapidly.

The usual kettle equipment consists of a furnace setting 10 of any suitable type, the inside bottom of which is formed into a fire box 11, where heat is supplied by means of suitable oil, gas or coal burning equipment. The kettle 12 is supported on suitable furnace setting shoulders 13, said kettle being spaced concentrically in the furnace setting bin by means of radially extending baffles or partitions 14. The furnace setting 10 is provided at its top with a stack 15 for conducting away the products of combustion.

In order to adapt the kettle equipment for use on a continuous basis, I have provided a fairly large diameter tube 16 arranged concentrically within the kettle 12 and rotatably mounted at its lower end in a bearing 17 formed in the kettle bottom 18. The upper end of tube 16 is rotatably received in a bearing bracket 19, the latter being secured to a suitable framework 20. Bevel gear 21 is secured to the upper end of tube 16 and meshes with a bevel gear 22 secured to the outer end of a drive shaft 23, the latter being driven by any suitable source of power not shown, such as an electric motor. Sweep or stirring rods 24 are radially secured at frequent vertical heights on tube 16, said rods being adapted to rotate between fire tubes 25 which extend transversely through the kettle 12 so as to increase the area of heating surface in contact with the material in the kettle. Curved scrapers, stirring arms or sweeps 24a are secured to the bottom of tube 16 so as to contact with or rotate adjacent the dished kettle bottom 18 to aid in preventing the overheating thereof. A horizontal baffle 26 is preferably provided within the furnace setting 10 around the kettle 12 for the purpose of causing the hot products of combustion to travel a circuitous path, first through the four lower tubes 25 and then through the four upper tubes in series.

A frusto-conical hopper 27 is secured to the upper end of the tube 16, and the raw gypsum in a finely ground state is introduced into said hopper, preferably by means of a conveyor belt 28 which passes around a drive pulley 29, the latter being rotatably mounted on the framework 20. Suitable openings 30 are provided in the tube 16 at the bottom of hopper 27, so that the granulated gypsum flows into the inside of said tube 16 from said hopper. Openings 31 are provided in the bottom of the tube 16 so as to permit the granulated gypsum to flow outwardly from tube 16 into the bottom of the kettle 12.

In order to cause a positive feed of the raw gypsum downwardly through tube 16 into the kettle 12, against the head of material in said kettle, I provide a fixed screw conveyor 32 within the tube 16, the shaft 33 of said screw conveyor being rigidly secured at its bottom to a fixed bracket 34, and at its top to a fixed bracket 35. This screw conveyor remains stationary while the tube 16 rotates, thus causing a downward movement of the material in said tube. As the material works upwardly in the kettle 12, it is heated up and the water of crystallization in the raw gypsum is driven off as steam until the material approaches the top of the kettle. A frusto-conical discharge ring 37 is formed around the upper end of kettle 12, and a stirring arm or sweep 38 is secured to the tube 16, being provided with ends 39 extending upwardly at an angle so as to conform to the shape of the discharge ring 37. Discharge chute 39' is secured to the discharge ring 37 and extends downwardly, so that the calcined gypsum flows from the kettle under the action of gravity.

The calcined gypsum passing out through the chute or duct 39 has all the characteristics of ordinary batch kettle stucco, except that it is of a lower consistency and an excess moisture content which is caused by the fact that the steam passes upwardly through the material before it leaves the kettle. In order to raise the consistency of the calcined gypsum, I therefore prefer to carry out the method in two stages, an initial stage carried out in kettle 12 while the final stage is carried out in one or a plurality of kettles 41. The kettles 41 may be four in number relative to the kettle 12 and the lower end of chute 39' preferably empties through the cover 42 of the kettle 41, so that the material to be calcined in the final stage passes downwardly through the kettle countercurrent to the flow of steam whereas the material in kettle 12 passes upwardly in a direction parallel to the flow of steam driven off from the gypsum.

The kettles 41 are preferably cylindrical in shape with a rounded bottom, and may be heated in any suitable way, such as by steam coils 44 which are arranged in the semicircular form shown in Fig. 3 having branch arms 45 connected with a steam header 46 which is supplied by steam from a supply line 47a. The steam coils 44 are preferably arranged in layers or banks, and stirring arms 47 are secured to a central shaft 48 and are arranged to rotate between the banks of steam coils for agitating the gypsum. The shaft 48 is provided at its upper end with a bevel gear 49 meshing with a similar bevel gear 50, the latter being secured to a drive shaft 51 driven by any suitable source of power, such as an electric motor not shown. The inner ends of shafts 48 and 51 are rotatably supported in suitable bearings 52 and 53 respectively which are secured to framework 54, and a pipe 55 is provided in the kettle cover 42 for permitting the escape of steam driven off from the calcining gypsum.

As previously mentioned, the partially calcined gypsum from kettle 12 passes through chute 39 and cover 42 into the top of kettle 41 where it moves downwardly under the action of gravity counter-current to the travel of the steam escaping through the pipe 55. A discharge tube 56 is provided in the bottom of kettle 41, said tube having an angular arm 57 which is closed by a valve 58 pivotally mounted to said arm by a pin 59. An outstanding lever arm 60 is also secured to the damper or valve 58, and a control rod 61 leads from lever 60 to a suitable control device convenient to the reach of the operator. The lower end of shaft 48 passes through the angular arm 57 and is rotatably mounted at its lower end in a step bearing 62 which may be attached to the floor 63. A short flight of screw conveyor 64 is provided on shaft 48 inside of tube 56, causing the discharge of the material from kettle 41 at a definite rate of flow.

In order to accurately control the temperature of discharge of the material from tube 56, I preferably provide a thermostatic element 65 extending into the tubular arm 57 in contact with the material being discharged. The usual connecting tube 66 extends from the thermostatic element 65 to an automatic valve 67 on steam line 47, so that changes in temperature of the material flowing from the tubular arm 57 will cause a change in the amount of steam supplied to steam coils 44, and thus maintains a substantially uniform temperature of discharge of the calcined gypsum. In this way, the consistency of the finished product may also be raised to the desired value. The pressure of steam in coils 44 may be maintained at any value to produce the desired finishing temperature in the calcined gypsum and superheated steam may be used if desired.

The kettle 41 is preferably insulated on all exposed surfaces and as the partly calcined material from the primary kettle completely surrounds the coils in kettle 41 the efficiency of this unit will be very high. This two stage system of calcination offers the advantages of finishing the calcination away from the steam expelled from the raw material, thus providing a high and uniform consistency for the stucco. As an example of the proper size of kettle to use, the kettle 12 may be of 50 ton capacity and the kettles 41 may be four in number if desired to operate on a batch system, or may be only one in number and operate on a continuous system as shown. The large kettles will operate on a capacity of 50 ton per hour, the discharge temperature of stucco will be 275° F., and the smaller kettles 41 will finish off the stucco at a temperature of 320° F.

My improved method of calcining gypsum has several advantages as follows:

1. The capacity of the equipment is increased on a continuous basis over that of batch operation, due to the fact that in batch operation it takes from 5 to 15 minutes to fill the kettle and about 5 minutes to dump same.

2. Firing may be done at a uniform rate with a fuel saving, whereas a batch kettle is fired hard during the early stages of cooking and banked during the finishing stage. Batch cooking heat losses also occur during the filling and dumping periods.

3. All conveying and handling equipment can be much smaller thus requiring less horse power with my continuous method, as each piece of apparatus will handle a steady, continuous load. In batch operation, the conveying equipment must handle peak loads during filling and dumping, and the equipment must be of large capacity in order to handle the material rapidly.

4. No trouble is experienced with my continuous kettle of burning out flues and kettle bottoms, as frequently happens in the batch process, since the wet raw material introduced into the bottom of the kettle acts as a protective cover for same, and maintains the bottom at a low temperature.

5. My improved continuous method offers a splendid opportunity for automatic control by a thermostatic regulator, which insures a saving in labor costs and also provides ease of operation and a product of uniform quality.

6. My method is based on the physical characteristics of the gypsum at different stages of calcination. The raw ground gypsum has a greater density than the calcined material, and when first introduced into the kettle it balls up and becomes very gummy. If the kettle is maintained quietly boiling as the raw gypsum is cooked, the gypsum will work its way to the surface as its density decreases, and will be discharged as a completely calcined product.

7. In my continuous kettle, the fire is kept at a constant stage and the temperature in the kettle is always the same, so that no pronounced "drag" is experienced as in a batch kettle, thus saving power needed for driving the stirring devices.

8. The consistency of the stucco produced is very uniform and will not change more than 1 to 2 cc., when the calcining temperature is uniform. When the temperature of the stucco at the discharge is 275° F., the normal consistency is 66 cc., and slight changes in temperature do not affect the consistency of the material.

9. A much coarser ground raw gypsum may be used than in the batch process, thus saving expense in grinding.

I would state in conclusion that while the illustrated example constitutes a practical embodiment of my invention, I do not wish to limit myself precisely to these details, since manifestly, the same may be considerably varied without departing from the spirit of the invention as defined in the appended claims.

Having thus described my invention, I claim as new and desire to secure by Letters Patent:

1. In a calcining apparatus for gypsum, a pair of cylinders of different diameters and in concentric arrangement, means for rotating the smaller of said cylinders, stirring arms secured to said small cylinder, said small cylinder being provided adjacent the upper and lower ends thereof with openings for the admission and discharge of material, a screw conveyor rigidly positioned in said small cylinder, means for rotating said small cylinder so as to cause the movement of material down said small cylinder into the bottom of said large cylinder, and means for heating said large cylinder.

2. In a continuous heating apparatus, the combination with a furnace setting and a cylindrical kettle within said furnace setting having its axis substantially vertical, means for moving material to be treated upwardly in said kettle, a second kettle, connecting means for moving heated material from the top of the first kettle to the top of the second kettle, means for moving the material downwardly in said second kettle, means for heating the material in said second kettle, means for discharging the material from the bottom of said second kettle, and means for permitting the escape of vapors from the top of both of said kettles.

3. In a continuous heating apparatus, the combination with a furnace setting and a kettle mounted within said furnace setting, of a cylinder rotatably mounted within said kettle, means for conveying material down said cylinder into the bottom of said kettle to be heated in said kettle, a second kettle, means for conveying material from the top of the first kettle to the second kettle, means for heating the material in the second kettle, means for discharging material from the second kettle, and thermostatic means associated with the material being discharged from the second kettle and adapted to automatically control the supply of heating fluid to said second kettle.

4. In a continuous heating apparatus, the combination with a furnace setting and a kettle having a bottom and mounted within said setting, of a cylinder rotatably mounted within said kettle, means for causing material to be heated to flow down said cylinder and onto said kettle bottom, means for removing heated material from said kettle from a point above said bottom, and a stirring arm secured to said cylinder adjacent said bottom, and adapted to stir the material and aid in preventing overheating of said bottom.

FRED J. GOUGH.